(12) United States Patent
Liu et al.

(10) Patent No.: US 11,129,186 B2
(45) Date of Patent: Sep. 21, 2021

(54) METHOD AND APPARATUS FOR TRANSMISSION OF UPLINK GRANT

(71) Applicant: Alcatel Lucent, Nozay (FR)

(72) Inventors: Jianguo Liu, Shanghai (CN); Tao Tao, Shanghai (CN); Yan Meng, Shanghai (CN); Sigen Ye, Whitehouse Station, NJ (US); Junrong Gu, Shanghai (CN); Gang Shen, Shanghai (CN)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 16/073,949

(22) PCT Filed: Jan. 24, 2017

(86) PCT No.: PCT/IB2017/000171
§ 371 (c)(1),
(2) Date: Jul. 30, 2018

(87) PCT Pub. No.: WO2017/134528
PCT Pub. Date: Aug. 10, 2017

(65) Prior Publication Data
US 2019/0045535 A1 Feb. 7, 2019

(30) Foreign Application Priority Data
Feb. 5, 2016 (CN) .......................... 201610082953.6

(51) Int. Cl.
*H04W 72/14* (2009.01)
*H04W 72/04* (2009.01)
*H04W 72/12* (2009.01)

(52) U.S. Cl.
CPC ....... *H04W 72/14* (2013.01); *H04W 72/0446* (2013.01); *H04W 72/1268* (2013.01); *H04W 72/1289* (2013.01)

(58) Field of Classification Search
CPC ..... H04W 72/02; H04W 72/04; H04W 72/14; H04W 72/0446; H04W 72/1268; H04W 72/1289
See application file for complete search history.

(56) References Cited

U.S. PATENT DOCUMENTS 10,349,401 B2 * 7/2019 Cheng ..................... H04L 5/001
10,993,220 B2 * 4/2021 Dinan ..................... H04L 5/005
(Continued)

FOREIGN PATENT DOCUMENTS

| CN | 102594438 A | 7/2012 |
| CN | 102651663 A | 8/2012 |

(Continued)

OTHER PUBLICATIONS

Zte, UL framework for LAA,: 3$^{rd}$ Generation Partnership Project (3GPP), 3GPP TSG RAN WG1 Meeting #82, R1-154048, pp. 1-6, XP050994123, Beijing, China, Aug. 24-28, 2015.
(Continued)

*Primary Examiner* — Candal Elpenord
(74) *Attorney, Agent, or Firm* — Fay Sharpe LLP

(57) ABSTRACT

Embodiments of the present disclosure provide a method and apparatus for transmitting uplink grant, the method comprising: transmitting the uplink grant by selecting a downlink subframe from a plurality of candidate downlink subframes each of the plurality of downlink subframes enabling scheduling of at least one user equipment to start transmitting burst data in a uplink subframe.

16 Claims, 3 Drawing Sheets

(56) References Cited

U.S. PATENT DOCUMENTS

| | | | |
|---|---|---|---|
| 2013/0336160 A1 | 12/2013 | Yin et al. | |
| 2015/0359029 A1 | 12/2015 | Seo et al. | |
| 2016/0007375 A1 | 1/2016 | Guo et al. | |
| 2017/0048880 A1* | 2/2017 | Anderson | H04W 72/1226 |
| 2017/0150367 A1* | 5/2017 | Han | H04L 5/001 |
| 2017/0164345 A1 | 6/2017 | Goto et al. | |
| 2018/0175975 A1* | 6/2018 | Um | H04L 1/1816 |
| 2018/0376434 A1* | 12/2018 | Cui | H04W 72/1289 |
| 2019/0045505 A1* | 2/2019 | Yang | H04W 72/14 |

FOREIGN PATENT DOCUMENTS

| | | |
|---|---|---|
| CN | 103873213 A | 6/2014 |
| CN | 104104477 A | 10/2014 |
| CN | 104104486 A | 10/2014 |
| CN | 104113924 A | 10/2014 |
| CN | 104982000 A | 10/2015 |
| WO | WO 2016/002855 A1 | 1/2016 |

OTHER PUBLICATIONS

"Status Report to TSG, Work Item on Licensed-Assisted Access to Unlicensed Spectrum," $3^{rd}$ Generation Partnership Project (3GPP), 3GPP TSG RAN Meeting #70, RP-151866, pp. 1-33, XP051052767, Sitges, Spain, Dec. 7-10, 2015.

Nokia Networks, "On DL/UL burst and subframe indication for LAA," $3^{rd}$ Generation Partnership Project (3GPP), 3GPP TSG RAN WG1 Meeting #83, R1-157133, pp. 1-5, XP051022192, Anaheim, USA, Nov. 15-22, 2015.

Nokia Networks, "LBT for LAA UL operation," $3^{rd}$ Generation Partnership Project (3GPP), 3GPP TSG RAN WG1, R1-154448, pp. 1-5, XP051001738, Beijing, China, Aug. 24-28, 2015.

International Search Report for PCT/IB2017/000171 dated May 24, 2017.

InterDigital Communications, "On Scheduling and HARQ Operation for LAA", 3GPP TSG-RAN WG1 Meeting #81, R1-153144, pp. 1-3, Fukuoka, Japan, May 25-29, 2015.

Alcatel-Lucent Shanghai Bell, Alcatel-Lucent, "UL LBT and FL/UL Frame Structure for LAA", 3GPP TSG RAN WG1 Meeting #82, R1-154574, pp. 1-6, Beijing, China, Aug. 25-28, 2015.

* cited by examiner

METHOD AND APPARATUS FOR TRANSMISSION OF UPLINK GRANT

FIELD

Embodiments of the present disclosure generally relate to the field of communication transmission, and more specifically, to uplink grant for uplink transmission in communication transmission.

BACKGROUND

In the 70$^{th}$ RAN conference, a new work item on enhanced Licensed-Assisted Access for LTE (eLAA-LTE) is approved to support Licensed-Assisted Access (LAA) Scell operation on unlicensed spectrum for uplink (UL) (see proposal RP-152272 "New Work Item on enhanced LAA for LTE", Ericsson, Huawei, December 7-Dec. 10, 2015). Specifically, both the self-scheduling and cross-carrier scheduling from licensed spectrum should be supported for UL transmission. For cross-carrier scheduling, the UL grant is sent from licensed carrier, based on which the user equipment (UE) could perform listen-before-talk (LBT) before its UL transmission. This means that only one LBT operation (i.e. the transmitter is required to perform LBT before transmission) is required for eLAA UL according to the requirement of the Europe regulation requirement on LBT (ETSI EN 301 893 (V1.8.0), "Harmonized EN covering the essential requirements of article 3.2 of the R&TTE Directive", January 2015). However, for self-scheduling, this may result in reduced channel utilization opportunities since two LBTs are required for UL transmission (i.e., the LBT is performed by the eLAA eNB before UL grant transmission, and the LBT is also performed by the UE before UL data transmission).

Therefore, the channel access issues for self-scheduling UL eLAA should be addressed so as to increase UL channel access opportunities and to increase resource utilization. As mentioned above, the channel access issue for UL data transmission would clearly lead to resource waste because the resource allocated to the UE could not be allocated to another UE. In the proposal submitted by the inventors "RI-154574" "LBT and Frame Structure Design for LAA with DL and UL", Alcatel-Lucent Shanghai Bell, Alcatel-Lucent, May 25-May 29, 2015, a contention-based UL access mechanism under the above situation is discussed to increase UL transmission opportunities, in which a group of users could be scheduled simultaneously to contend the same resource with different CCA timing instant. However, up till now, there is no detailed solution addressing UL grant issue for self-scheduling UL eLAA. In embodiments of the subject matter described herein, the enhanced UL grant mechanism will be presented to increase the transmission opportunity of UL grant for UL transmission.

SUMMARY

In the current LTE specification, the UL grant for the uplink transmission is transmitted in the downlink subframe (for example, the delay between two subframes is 4 ms) which is predefined before the uplink subframe needed to be uplink transmitted, namely, the timing between the two is predefined. The basic idea of embodiments of the subject matter described herein is different from the current LTE system as it employs forward UL grant to further improve opportunities of UL grant for UL transmission.

According to an aspect of the subject matter described herein, there is provided a method for uplink grant transmission, comprising: transmitting the uplink grant by selecting a downlink subframe from a plurality of candidate downlink subframes, each of the plurality of downlink subframes enabling scheduling of at least one UE to start transmitting burst data in the uplink subframe.

According to an embodiment of the subject matter described herein, the transmission method further comprises: determining, based on a monitoring operation, an idle downlink subframe from a plurality of candidate downlink subframes as the downlink subframe to transmit the uplink grant.

According to an embodiment of the subject matter described herein, in the transmission method, requirement of minimum scheduling delay is met between the selected downlink subframe and the uplink subframe for transmitting burst data.

According an embodiment of the subject matter described herein, the transmission method further comprises: dynamically indicating an actual delay between the selected downlink subframe and the uplink subframe with first downlink control information, the actual delay meeting the requirement of minimum scheduling delay. For instance, the timing transmitted by the scheduled data can be indicated dynamically in the downlink control information (DCI). The DCI indicates that in which subframes the scheduled data transmission should be transmitted.

According to an embodiment of the subject matter described herein, the transmission method further comprises: dynamically indicating duration of the burst data with second downlink control information.

According to another second aspect of the subject matter described herein, there is provided an apparatus for transmitting uplink grant, comprising: a transmitting module for transmitting uplink grant by selecting a downlink subframe from a plurality of candidate downlink subframes to, each of the downlink subframes enabling scheduling of at least one UE to start transmitting burst data on a same UL subframe.

According to an embodiment of the subject matter described herein, the apparatus further comprises: a monitoring module for determining, based on a monitoring operation, an idle downlink subframe from a plurality of candidate downlink subframes as the downlink subframe to transmit the uplink grant.

According to an embodiment of the subject matter described herein, in the equipment, a requirement of minimum scheduling delay is met between the downlink subframe and the uplink subframe for transmitting burst data.

According to an embodiment of the subject matter described herein, the apparatus further includes: a first indicating module for dynamically indicating an actual delay between the selected downlink subframe and the uplink subframe with the first downlink control information, the actual delay meeting the requirement of minimum scheduling delay.

According to an embodiment of the subject matter described herein, the apparatus further includes: a second indicating module for dynamically indicating duration of the burst data with second downlink control information.

DETAILED DESCRIPTION OF EMBODIMENTS

In order to achieve the above opportunity UL grant to further improve the UL opportunities for UL transmission, in the subject matter described herein, delay between a downlink instruction and uplink transmission is indicated by scheduling delay information, namely, indication is performed by the relative timing between the DCI and the scheduled data transmission.

For example, when the DCI is transmitted in subframe n, the scheduled data transmission can be performed in subframe n+4, n+5, n+6, or n+7 depending on the indicated value in the DCI.

Specifically, in an embodiment of the subject matter described herein, there is provided a finite number of possible values. The indication of the relative timing can represent the absolute value of the scheduling delay, or an index may be used to point to one of the values in a set. In the latter case, the set of possible values can be either pre-defined in the specifications, or indicated by higher layer signaling.

This part provides a plurality of embodiments of the solution proposed in the context of UL eLAA with self-scheduling, in which a forward UL grant method is utilized to increase UL scheduling opportunity on unlicensed spectrum.

Forward UL Grant

Assuming that N candidate subframes are allowed for transmitting UL grant of a specific UL subframe $K_U$, scheduling delay (i.e. the difference between the subframe $K_D$ of UL grant transmission and the scheduled subframe $K_U$) should be less than $T_{min}$ in consideration of the actual processing capability of UE. The minimum scheduling delay $T_{min}$ and the number of candidate subframes N may be configured by OAM (Operation Administration and Maintenance). Currently, the minimum scheduling delay used by LTE is 4 ms and the number of the candidate subframes is 1. In this solution, multiple candidate subframes would be considered for transmission of UL grant. Based on the configuration of candidate subframes, the serving eNB would perform the LBT procedure of the candidate subframes and send the UL grant of a specific subframe to its scheduled UE in one of candidate subframes on which the channel is idle. Herein, the scheduling delay should be included in the UL grant DCI, otherwise the default scheduling delay, e.g. 4 ms, would be considered for UL grant if the schedule delay is absent from UL grant DCI. At the same time, UE would blindly detect the UL grant DCI in the DL subframes. Based on UL grant information, the scheduled UE would know in which subframe it is scheduled for UL transmission.

Figure 1:
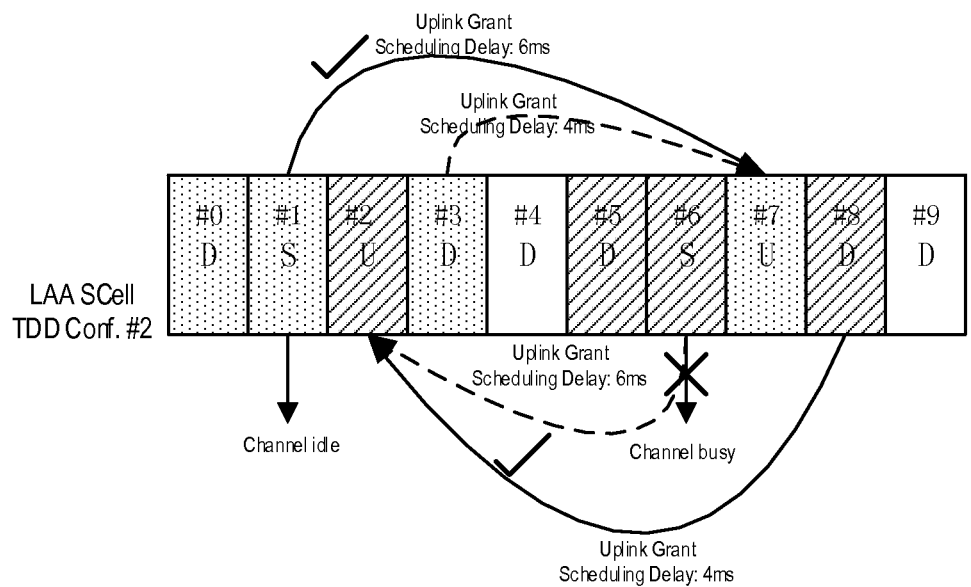
FIG. 1 illustrates an uplink grant design of the first alternative solution given in combination with TDD configuration 2.

As illustrated in FIG. 1, UL grant can be transmitted by selecting a downlink subframe from a plurality of candidate downlink subframes, each of the plurality of downlink subframes enabling scheduling of at least one UE to start transmitting burst data in a same uplink subframe.

Optionally, when the transmitter needs to perform LBT before transmission, the idle downlink subframe for transmitting uplink grant can be determined based on a monitoring operation.

Figure 2:
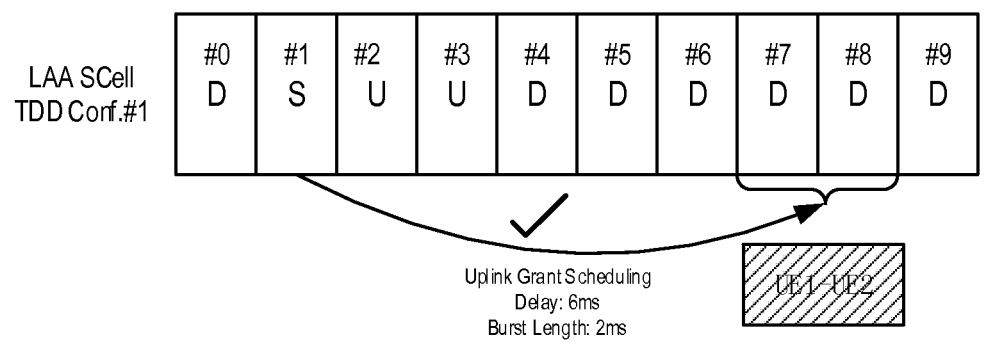
FIG. 2 is illustration for enhanced UL grant mechanism for a plurality of UEs in combination with multiple-subframe scheduling.

In the following, UL grant design is provided for performing LBT scheme (the first alternative) before UL transmission by the UE in combination with TDD configuration 2. Assuming that the minimum scheduling delay is 4 ms and three candidate subframes are configured for UL grant on unlicensed carrier, i.e., the downlink subframes #1/3 are configured for UL grant of UL subframe #7, and the downlink subframes #6/8 are configured for UL grant of UL subframe #2. The serving eNB would firstly perform LBT of subframe #1. If the channel is idle in the subframe #1, the serving eNB would indicate the UL grant information of the subframe #7 to the scheduled UE. For uplink subframe #2, the serving eNB would firstly perform LBT of the subframe #6. As the channel is busy at the subframe #6, the serving eNB can indicate UL grant information of the subframe #2 on the subframe #8 on which the channel is idle. As shown in FIG. 2, the selected downlink subframe and the uplink subframe for transmitting data have a delay of 4 ms and 6 ms, respectively. Alternatively, the delay between the selected downlink subframe and the uplink subframe is indicated by the first downlink control information.

Optionally, the duration of burst data can be indicated dynamically with the second downlink control information. As illustrated in FIG. 2, the duration of burst data is indicated dynamically with the second downlink control information as two uplink subframes, namely, indicating that both UE1 and UE2 use the two uplink subframes #7 and #8 for uplink transmission.

In comparison with existing UL grant design with 4 ms scheduling delay, the proposed solution would obtain more scheduling opportunity for UL transmission in the case of self-scheduling on unlicensed carrier, for example, under this situation, for the current UL grant mechanism, UL subframe #7 would lose UL grant opportunity since the subframe #3 is busy.

Utilization with Multiple-Subframe Scheduling

In order to further improve UL scheduling grant opportunities, the proposed opportunity UL grant mechanism may be combined with multiple-subframe scheduling, i.e., a UE would be scheduled to transmit UL data on multiple successive UL subframes via one UL grant once the eNB obtains the channel on one of multiple candidate positions. In this case, the number of granted subframes needs to be implicitly or explicitly indicated to UE besides the scheduling delay. The detailed method is as below:

1) In an embodiment, the number of granted subframes for a UE may be explicitly indicated by UL grant DCI.

2) In another embodiment, the number of granted subframes for a UE may be implicitly indicated by TDD configuration. Once a UE detects its UL grant, the UE would be scheduled on the subsequent multiple UL subframes of TDD configuration. In this case, the mode on multiple-subframe scheduling for UL transmission on eLAA SCell should be pre-defined or indicated by eNB via RRC signalling or L1 signalling (e.g. indicated in UL grant).

Based on detection of UL grant, the scheduled UE would identify its resource allocation information and which UL subframes are allocated for it. For example, as shown in FIG. 2, a plurality of subframes (e.g. subframe #7 and subframe #8) can be scheduled and granted for at least one UE (for example, UE1/UE2) for uplink transmission on a candidate downlink subframe (for example, subframe #1).

It can be understood that in the context UL eLAA with self-scheduling, embodiments of the subject matter described herein allow opportunity transmission of UL grant when the DL channel is available, which increases scheduling opportunity of UL transmission. The solutions of embodiments of the subject matter described herein haves the following advantages:

1) This solution allows eNB indicating the UL grant for UL transmission in the subframe in one of multiple candidate subframes. Therefore, the UL grant can be transmitted if the channel is idle on any one of multiple candidate subframes. Compared to the legacy UL grant transmission with pre-defined scheduling delay, the proposed solution provides more transmission opportunities for the UL. According to the detection of UL grant DCI, the scheduled UEs would know in which subframe they are scheduled for UL transmission based on the timing indication in the UL grant.

For different UEs scheduled in the same UL subframe, the corresponding UL grant information may be indicated by eNB in different candidate subframes to enable flexible scheduling at eNB side.

If multiple-subframe scheduling (i.e. multiple subframes could be scheduled to a UE via a UL grant once the eNB senses the channel idle) is supported for UL grant, combined with the utilization of the multiple-subframe scheduling UL grant, forward UL grant can further increase the scheduling opportunities of UL transmissions.

It should be noted that embodiments of the subject matter described herein can also be used in cases other than UL eLAA with self-scheduling. For example, it could be used for DL or UL transmissions in an LTE system if embodiments of the subject matter described herein are considered to be beneficial.

Figure 3:
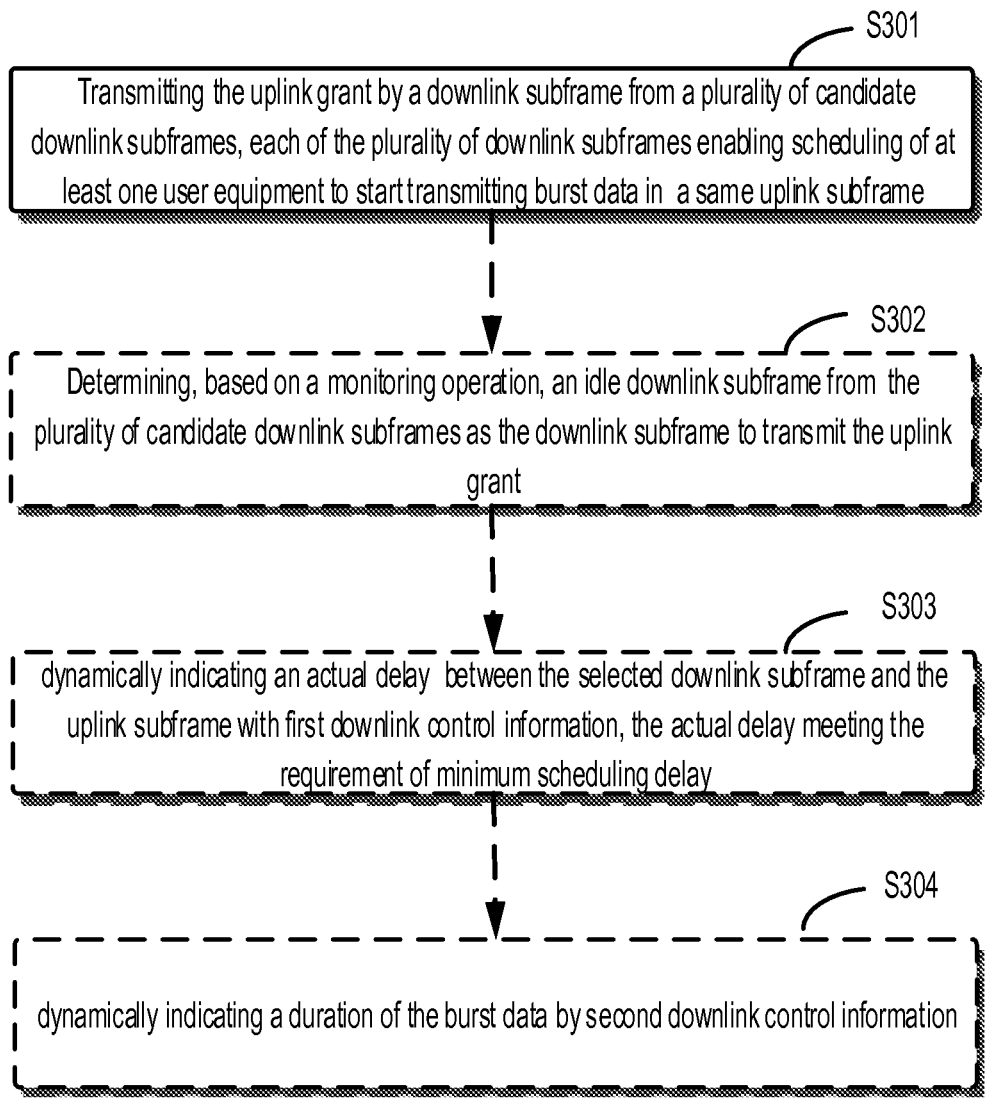
FIG. 3 illustrates a transmission method for uplink grant according to an embodiment of the subject matter described herein.

FIG. 3 illustrates a transmission method for uplink grant according to an embodiment of the subject matter described herein. As shown in FIG. 3, it comprises steps S301-S304. At S301, the uplink grant is transmitted by selecting downlink subframes from a plurality of candidate downlink subframes, in which all of the plurality of downlink subframes can schedule at least one UE starting transmit burst data on the same uplink subframe. Optionally, at S302, an idle downlink subframe to be used for transmitting uplink grant is determined from a plurality of candidate downlink subframes by a monitoring operation. Optionally, at S303, the actual delay that meets the minimum scheduling delay requirement and is between the selected downlink subframe and the uplink subframe is indicated dynamically by first downlink control information. Optionally, at S304, the duration of the burst data is indicated dynamically with second downlink control information.

Figure 4:
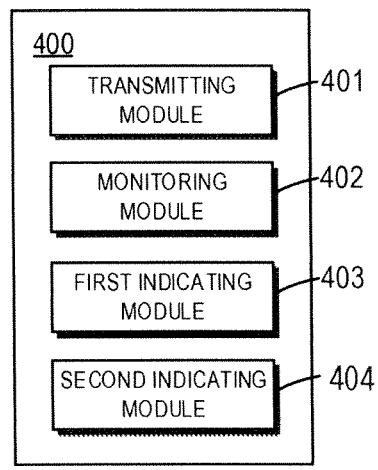
FIG. 4 illustrates an apparatus for transmitting uplink grant according to an embodiment of the subject matter described herein.

FIG. 4 illustrates an apparatus 400 for transmitting uplink grant according to embodiments of the subject matter described herein. Apparatus 400 includes: a transmitting module 401, a monitoring module 402, a first indicating module 403 and a second indicating module 404. The transmitting module 401 is used to transmit UL grant by selecting a downlink subframe from a plurality of candidate downlink subframes, each of the plurality of downlink subframes enabling scheduling at least one UE to start transmitting burst data in a same uplink subframe. The monitoring module 402 can be used to determine an idle downlink subframe from a plurality of candidate downlink subframes as the downlink subframe to transmit the uplink grant based on a monitoring operation. The first indicating module 403 is used to dynamically indicate an actual delay between the selected downlink subframe and the uplink subframe with first downlink control information, the actual delay meeting the requirement of minimum scheduling delay requirement. The second indicating module 404 is used to dynamically indicate duration of the burst data with the second downlink control information.

Figure 5:
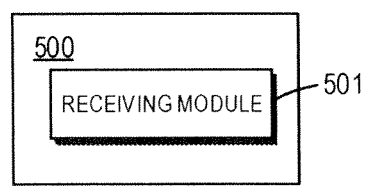
FIG. 5 illustrates an apparatus for receiving uplink grant according to an embodiment of the subject matter described herein.

FIG. 5 illustrates an apparatus 500 for receiving UL grant according to embodiments of the subject matter described herein. The apparatus 500 includes a receiving module 501 for receiving uplink grant transmitted on the downlink subframe, in which the downlink subframe for transmitting UL grant is selected from a plurality of candidate downlink subframes and all of the plurality of downlink subframes can schedule at least one UE starting to transmit burst data on the same uplink subframe; receiving first downlink control information dynamically indicating the actual delay that meets the minimum scheduling delay requirement and is between the selected downlink subframe and the uplink subframe; and receiving second downlink control information dynamically indicating the duration of the burst data.

Though several embodiments of the technical solution according to embodiments of the subject matter described herein are only depicted in combination with UL eLLA-LTE with self-scheduling, it should be understood that embodiments of the subject matter described herein can also be used in cases other than UL eLAA with self-scheduling. As stated above, if the solution of embodiments of the subject matter described herein is considered to be beneficial, it can also be employed in DL transmission and UL transmission for the LTE system. Furthermore, the technical solution of the implementations of the subject matter described herein is not limited to the disclosure of the above embodiments and the protection scope of embodiments of the subject matter described herein is only limited by the content of the claims.

We claim:

1. A method of transmitting an uplink grant, comprising:
   transmitting the uplink grant by selecting a downlink subframe from a plurality of candidate downlink subframes, the plurality of downlink subframes enabling scheduling of at least one user equipment to start transmitting burst data in an uplink subframe, wherein the at least one user equipment is scheduled to transmit uplink data on multiple successive uplink subframes via one uplink grant once a channel on one of multiple candidate positions is obtained and a number of granted subframes for the at least one user equipment is explicitly indicated by uplink grant downlink control information,
   wherein the method further comprises:
   dynamically indicating an actual delay between the selected downlink subframe and the uplink subframe with downlink control information, the actual delay meeting a requirement of minimum scheduling delay.

2. The method according to claim 1, wherein the selecting comprises:
   determining, based on a monitoring operation, an idle downlink subframe from the plurality of candidate downlink subframes as the downlink subframe to transmit the uplink grant.

3. The method according to claim 1, wherein a requirement of minimum scheduling delay is met between the selected downlink subframe and the uplink subframe for transmitting the burst data.

4. The method according to claim 1, further comprising:
   dynamically indicating a duration of the burst data with second downlink control information.

5. An apparatus for transmission of an uplink grant, comprising:
- at least one processor; and
- at least one memory including computer program code;
- the at least one memory and the computer program code configured to, with the at least one processor, cause apparatus at least to perform:
- transmitting the uplink grant by selecting a downlink subframe from a plurality of candidate downlink subframes, the plurality of downlink subframes enabling scheduling of at least one user equipment to start transmitting burst data in an uplink subframe, wherein the at least one user equipment is scheduled to transmit uplink data on multiple successive uplink subframes via one uplink grant once a channel on one of multiple candidate positions is obtained and a number of granted subframes for the at least one user equipment is explicitly indicated by uplink grant downlink control information,
- wherein the at least one memory and the computer program code are further configured to, with the at least one processor, cause the apparatus at least to perform:
- dynamically indicating an actual delay between the selected downlink subframe and the uplink subframe with downlink control information, the actual delay meeting a requirement of minimum scheduling delay.

6. The apparatus according to claim 5, wherein the at least one memory and the computer program code are configured to, with the at least one processor, cause the apparatus at least to perform:
- determining, based on a monitoring operation, an idle downlink subframe from the plurality of candidate downlink subframes as the downlink subframe to transmit the uplink grant.

7. The apparatus according to claim 5, wherein a requirement of minimum scheduling delay is met between the selected downlink subframe and the uplink subframe for transmitting the burst data.

8. The apparatus according to claim 5, wherein the at least one memory and the computer program code are configured to, with the at least one processor, cause the apparatus at least to perform:
- dynamically indicating a duration of the burst data with the second downlink control information.

9. A method of receiving an uplink grant, comprising:
- receiving, at a user equipment, the uplink grant transmitted on a downlink subframe, the downlink subframe being selected from a plurality of candidate downlink subframes, the plurality of downlink subframes enabling scheduling of the user equipment to start transmitting burst data in an uplink subframe, wherein the at least one user equipment is scheduled to transmit uplink data on multiple successive uplink subframes via one uplink grant once a channel on one of multiple candidate positions is obtained and a number of granted subframes for the at least one user equipment is explicitly indicated by uplink grant downlink control information,
- wherein the method further comprises:
- receiving downlink control information dynamically indicating an actual delay between the downlink subframe and the uplink subframe, the actual delay meeting the requirement of minimum scheduling delay.

10. The method according to claim 9, wherein the downlink subframe is an idle downlink subframe which is determined, based on a monitoring operation, from the plurality of candidate downlink subframes to transmit the uplink grant.

11. The method according to claim 9, wherein a requirement of minimum scheduling delay is met between the downlink subframe and the uplink subframe for transmitting the burst data.

12. The method according to claim 9, further comprising:
- receiving second downlink control information dynamically indicating a duration of the burst data.

13. An apparatus for receiving an uplink grant, comprising:
- at least one processor; and
- at least one memory including computer program code;
- the at least one memory and the computer program code configured to, with the at least one processor, cause apparatus at least to perform:
- receiving the uplink grant transmitted on a downlink subframe, the downlink subframe being selected from a plurality of candidate downlink subframes, the plurality of downlink subframes enabling scheduling of the apparatus to start transmitting burst data in an uplink subframe, wherein the at least one user equipment is scheduled to transmit uplink data on multiple successive uplink subframes via one uplink grant once a channel on one of multiple candidate positions is obtained and a number of granted subframes for the at least one user equipment is explicitly indicated by uplink grant downlink control information,
- wherein the at least one memory and the computer program code are further configured to, with the at least one processor, cause the apparatus at least to perform:
- receiving downlink control information dynamically indicating an actual delay between the downlink subframe and the uplink subframe, the actual delay meeting the requirement of minimum scheduling delay.

14. The apparatus according to claim 13, wherein the downlink subframe is an idle downlink subframe which is determined, based on a monitoring operation, from the plurality of candidate downlink subframes to transmit the uplink grant.

15. The apparatus according to claim 13, wherein a requirement of minimum scheduling delay is met between the downlink subframe and the uplink subframe for transmitting the burst data.

16. The apparatus according to claim 13, wherein the at least one memory and the computer program code are configured to, with the at least one processor, cause the apparatus at least to perform:
- receiving second downlink control information dynamically indicating a duration of the burst data.

* * * * *